Feb. 2, 1960

N. T. BERKELMANS 2,923,393

STENOGRAPHIC MACHINE

Filed March 24, 1958

2 Sheets-Sheet 1

INITIAL CONSONANTS

FINAL CONSONANTS

INVENTOR.
Nicholas T. Berkelmans
BY
Garvey & Garvey
ATTYS

INVENTOR.
Nicholas T. Berkelmans
BY
Garvey & Garvey
ATTYS

United States Patent Office 2,923,393
Patented Feb. 2, 1960

2,923,393

STENOGRAPHIC MACHINE

Nicholas T. Berkelmans, St. Pierre, Belgium

Application March 24, 1958, Serial No. 723,364
10 Claims. (Cl. 197—9)

This invention relates to a stenographic machine and is a continuation-in-part of application, Serial Number 543,813, filed by me October 31, 1955, now Patent No. 2,835,368.

It is the principal object of this invention to provide a stenographic machine for typing words orthographically on a syllabic basis, including a single-case keyboard having a plurality of keys operable singly or in multiple, to reproduce characters which resemble or produce a reasonable facsimile of the letters of the alphabet, the keys being of such a number and so arranged that the fingers of both hands operate no more than two keys each.

Other objects are to reduce the number of keys comprising the keyboard to eighteen, the characters of selected adjacent keys being related to reproduce additional letters when the keys are simultaneously struck; to provide a stenographic machine of the character described in which the keys are strategically located to effect in excess of ninety percent correct spelling for any language in which Latin characters are used; to provide a stenographic machine of the character described, certain types of which are each adapted to selectively reproduce multiple characters, the particular character reproduced depending upon the amount of pressure with which the operating key is struck; to provide a keyboard which is operated without lateral shifting of the hands or fingers and in which the pattern of "home row" keys corresponds with the most natural position of the hands, these keys representing the greater majority of the keys struck; and to arrange the keys of the keyboard to obtain maximum symmetry in shape and positioning of the characters and also symmetry in manipulation thereof for reproducing combined letters.

Other objects of the invention will be manifest from the following description of the present preferred form of the invention, taken in connection with the accompanying drawings, wherein.

Figure 1:
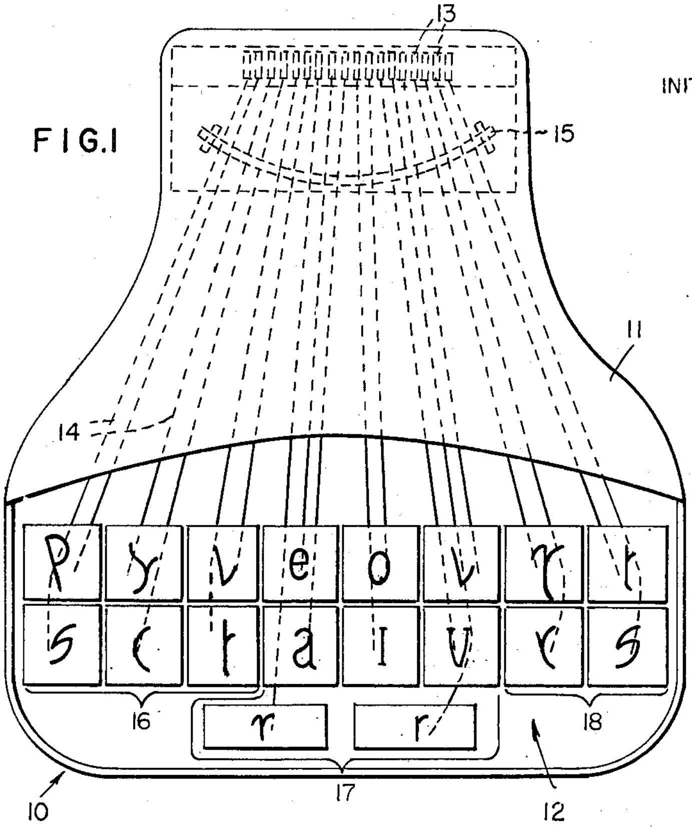
Fig. 1 is a top plan view of a stenographic machine constructed in accordance with the present invention.

Referring now in greater detail to Fig. 1 of the drawings, the machine of the present invention comprises a frame or casing 10 including a cover 11 and a keyboard 12. Adapted to engage a paper roll carried by frame 10 are a plurality of type bars 13 supported by lever arms 14. A lever arm rest is indicated at 15. Type bars 13 are selectively raised to contact the paper roll by operation of a key or keys comprising keyboard 12 which directly actuate lever arms 14. Conventional spring means (not shown) are provided for returning the type bars to their rest position upon release of the particular key or keys. Any conventional escape mechanism may be employed for moving the paper through the machine a predetermined amount, after each simultaneous depression of a key or keys. It is to be understood that the paper roll may be fed aft from the machine, after the fashion of a typewriter, or fed laterally therefrom, after the fashion of a ticker-tape machine.

Keyboard 12 of the present invention is banked, and, for purposes of description, is considered to be divided into three blocks of keys designated 16, 17 and 18. Block 16 comprises six keys arranged in three columns of two keys each and operated by the little finger, ring finger and middle finger of the left hand. Each finger therefore operates two keys, movement thereof being strictly fore and aft. It will be seen from a consideration of Fig. 1, that the keys in block 16 comprise the initial consonants of the syllable to be reproduced, and are actuated by the fingers of the left hand, the first column including the "P" and "S" keys, operated by the little finger, the second column including the "C" and "F" keys, operated by the ring finger, and the lower key of the third column being the "T" key. The top key of the third column is for the liquid consonant "L." The "T" and "L" keys are actuated by the middle finger.

Central block 17 of keyboard 12 comprises eight keys in three columns, two of which columns are composed of three keys each and the third or right-hand column having two keys. The two columns of three keys each are operated by both index fingers and both thumbs, while the third column is operated by the middle finger of the right hand. The keys of central block 17 make up the vowels "E," "A," "I," "O," "U," and liquid consonants "L" and "R." The "E" and "A" keys of the first column in block 17 are operated by the index finger of the left hand and the "R" key of the same column is operated by the left thumb. The "I" and "O" keys of the second column are operated by the index finger of the right hand and the "R" key of the same column is operated by the right thumb. The right hand column of keys of block 17 comprises the "L" and "U" keys, which are operated by the middle finger of the right hand. It will be apparent from the foregoing, therefore, that with the present keyboard, each thumb operates one key only.

Block 18 comprises four keys, arranged in two columns of two keys each, operated by the ring finger and little finger of the right hand. Each finger selectively operates two keys by fore and aft movement in the same manner as the keys of blocks 16 and 17. These keys comprise final consonants of the syllable to be reproduced, the first column including the "F" and "C" keys, the second column being composed of "T" and "S" keys.

Figure 2:
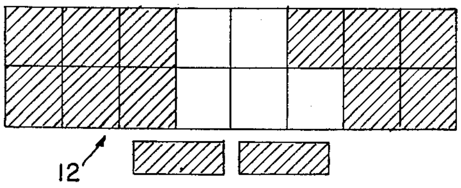
Fig. 2 is a schematic view of the keyboard of the present stenographic machine, certain keys thereof being hatched to illustrate the symmetry of the keyboard.

In Fig. 2 there is illustrated a schematic view of the keyboard in which the initial and final consonants are hatched to show the symmetry or approximate equilibrium effected by use of the keyboard of the present invention. It has been found that by centrally locating the liquid consonants and by positioning the vowel keys so that the majority thereof are operated by the right hand, the desired equilibrium is attained.

Figure 3:
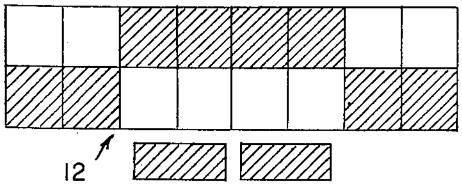
Fig. 3 is a similar view, certain keys of the keyboard being hatched to illustrate the "home row"
Figure 4:
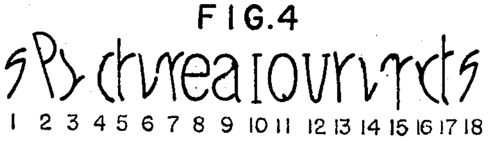
Fig. 4 illustrates the sequence of characters made by the present invention.
Figure 7:
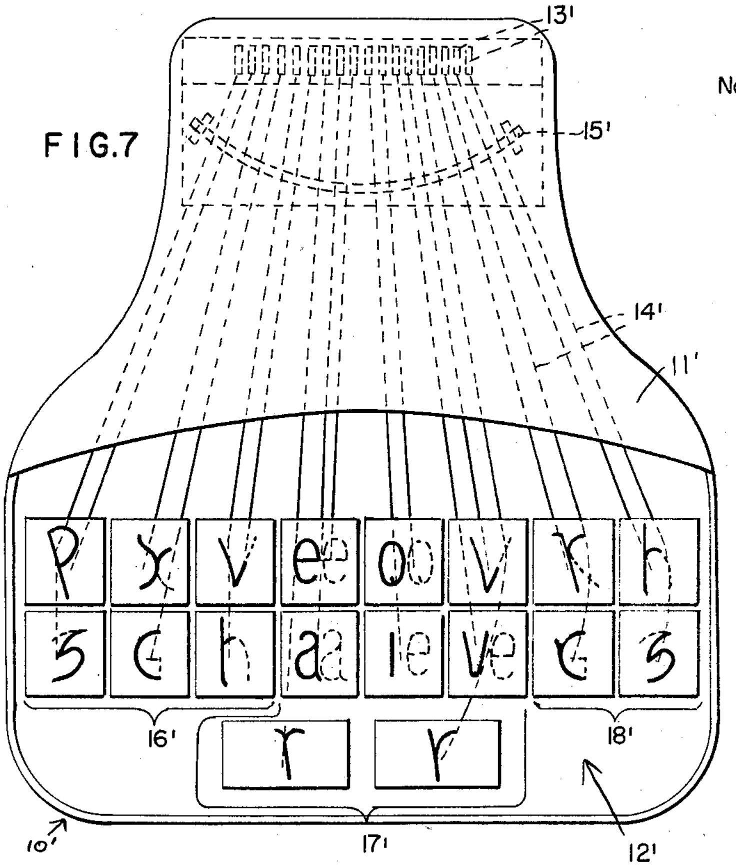
Fig. 7 is a top plan view of a stenographic machine illustrating a modified form of the present invention.

In Fig. 3, the hatched keys designate the "home row" position of the fingers on keyboard 12. It will be noted that the pattern of the "home row" keys generally corresponds to the most natural position of the hands and that the keys of each column are selectively operated by fore and aft movement of the proper finger or fingers. Since the thumbs operate one key only, no lateral or fore and aft movement thereof is required. The "home row" keys represent, on the average, sixty-five percent of the keys struck.

As shown to advantage in Figs. 1, 4, 5 and 6, the characters typed by some of the keys are similar to letters of the alphabet while other characters have features which suggest more than one letter to indicate the dual function of the particular key. In block 16, for example, certain characters serve a dual function by virtue of their similarity in sound, appearance or derivation to several letters of the alphabet. The letter "S" in block 16 is also used for the letter "Z," because of the similarity in sound of these letters. The same is true of the "C" key which is used for the letter "K" and also, because of its similarity in appearance and derivation, is used for the letter "G." The character used for the letters "Y," "J" and "F" is suggestive in appearance to all of these letters.

In block 17, the same characters are used for the letters "O" and "Q" and for the letters "L" and "V," since these respective characters are each suggestive of these two letters.

Figure 5:
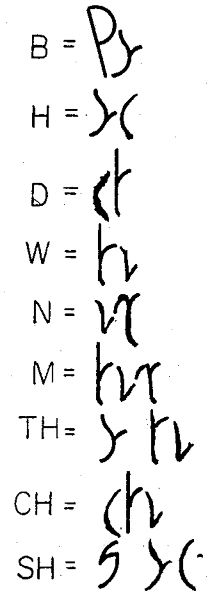
Fig. 5 illustrates the combination letters comprising initial consonants reproduced by the machine of the present invention.

In Fig. 5, there are set out initial consonants formed by combining the characters of block 16 and liquid consonant "R" of vowel block 17. It will be noted that the consonant values "M," "TH," "CH" and "SH" require the simultaneous depression of three keys, while the formation of combination letters "B," "D," "N," "W," and "H" require the simultaneous depression of only two keys. Thus the keys of block 16 taken singly, and in combination with liquid consonant key "R" of block 17 form at least fifteen phonetical values, viz. "S," "P," "F," "C," "T," "L," "B," "H," "D," "W," "N," "M," "TH," "CH," and "SH."

The characters of block 18 are to some extent, similar to that found in block 16. For example, the "T" of block 18 is quite similar to the "T" of block 16; the "C" key of block 18 is similar to the "C" key of block 16 and is also used for the letters "K" and "G" as in block 16. The "Y" key of block 18 is considerably different in appearance from that in block 16 but is also used for the letter "F" because of its resemblance thereto. Letter "S" of block 18 is the same as the "S" of block 16, and its shape suggests its use as the letter "H."

Figure 6:
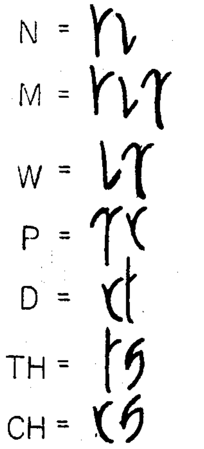
Fig. 6 illustrates the combination letters comprising final consonants reproduced by the machine of the present invention.

In Fig. 6, there are illustrated the consonants formed with the liquid consonant keys of vowel block 17 and final consonant block 18 by combining the characters typed by these keys. The letter "M" is formed by combining the indicia of three keys, while the remainder are formed by the indicia of only two keys. The keys of block 18 together with liquid consonant keys "R" and "L" of vowel block 17, form at least thirteen phonetical values, viz. "R," "L," "F," "C," "T," "S," "N," "M," "W," "P," "D," "TH" and "CH."

In forming the majority of the combination letters, laterally adjacent keys are depressed. However, in forming initials "H," "W," "M" and final "P" and "TH," two keys in the same column are operated by one finger. This is readily done by virtue of the close proximity of the keys.

In Figs. 7 to 11, there is illustrated a modified form of the present invention in which parts thereof corresponding to like portions of the form of invention shown in Figs. 1 to 6 are identified by like, primed numbers. This form of the invention reproduces the same characters in the same sequence as the machine shown in Figs. 1 to 6, when the keys are struck with normal pressure. However, in order to effect greater clarity of characters used to represent a plurality of letters of the alphabet, and to provide a larger number of diphthong combinations, with more correct spelling, as a result, fifteen of the eighteen keys have supplementary type portions.

Figure 9:
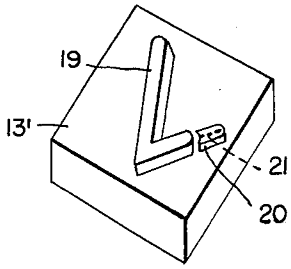
Fig. 9 is an enlarged perspective view of a type bar forming a part of the modified form of the present invention.
Figure 10:
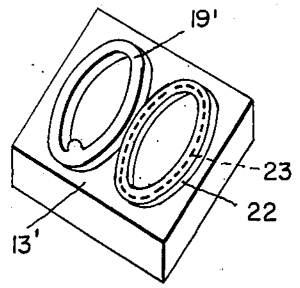
Fig. 10 is an enlarged perspective view of still another type bar forming a part of the present invention.

The supplementary type portions consist of either extensions of existing characters, illustrated in Fig. 9, or separate entities, illustrated in Fig. 10. In Fig. 9, there is shown a type bar 13' on which is mounted a main or primary type 19, which in this case, is the character for the letter "L." In accordance with the present invention, this same character is also used to represent the letter "V," because of its resemblance thereto. However, in order to give this character a stronger resemblance to the letter "V," there is also mounted on type bar 13', adjacent the shorter leg of the character, a type extension 20 preferably including elongated protuberances or the like designated 21, for reproducing a dotted line, the horizontal plane of the outer face of said protuberances being a fraction of an inch below the outer plane of the ribbon-engaging face of main type 19. Therefore, when the operating key is struck with normal pressure, only the imprint of main type 19 will appear on the paper roll, but when it is struck with additional pressure, the imprint of main type 19 plus that of type extension protuberances 21 will be reproduced.

In Fig. 10, there is shown an example of a supplementary type portion which is not an extension of the main type, but is separate and distinct therefrom. For purposes of illustration, the type for the letter "O" is shown, which embodies a main type 19' alongside of which is a recessed type 22 having a series of spaced elongated protuberances 23 arranged in the shape of an "O." Therefore, when the operating key is struck, with normal pressure, only the main type or "O" is reproduced, whereas, when the key is struck with additional pressure, the diphthong "OO" is reproduced.

Figure 8:
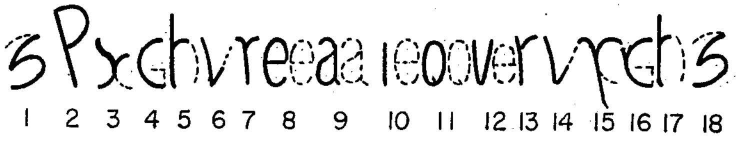
Fig. 8 illustrates the sequence of letters made by the form of the invention shown in Fig. 7.

In Fig. 8, the sequence of characters produced by the modified form of the invention is set out, the bold print indicating the character imprinted by the main or primary types and the dotted portions representing the type extensions and supplementary types. It is of course to be understood that full lines may be employed in lieu of dotted lines for the supplementary type portions.

Figure 11:
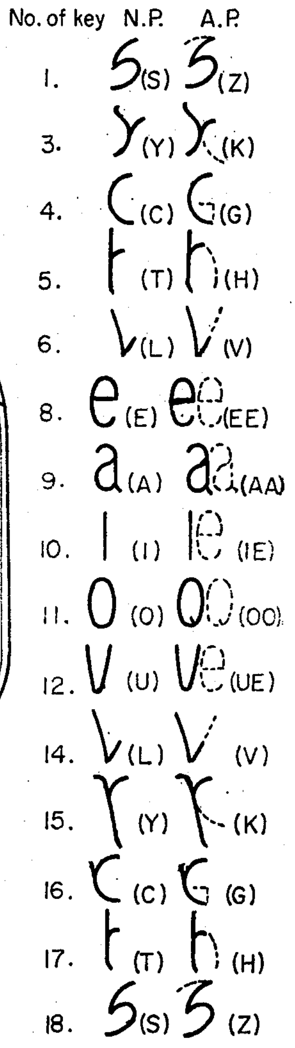
Fig. 11 is a table illustrating the character reproduced by striking selected keys with normal pressure and additional pressure in the form of invention shown in Fig. 7.

Fig. 11 is a table illustrating the characters reproduced by those types having supplementary type portions, when the keys are struck with normal and with additional force. The corresponding letter or letters of the alphabet are indicated in parenthesis. A consideration of this table clearly points out the close resemblance of the characters to the letters of the alphabet which they represent. The combination letters shown in Figs. 5 and 6 remain the same in this form of the invention.

The sequence of vowels employed by the present machine, "E," "A," "I," "O" and "U" has been found to be the most favorable sequence in writing the English language since, in this sequence, the letters can be combined to form the most frequently occurring diphthongs in the language, i.e. "OU," "EA," "IO" and "AI." These diphthongs appear in the English language more than three times as often as the remaining diphthongs taken together. It is of course within the contemplation of the present invention to rearrange this sequence to best suit any other language employing Latin characters for which the present machine might be used.

With the machine of the present invention, the spelling of words is at least ninety percent correct for any language in which Latin characters are used, this accuracy being considerably greater with the machine shown in Figs. 7 to 11. Furthermore, the simplicity of the machine, coupled with the clarity of the typed characters, enable a novice to master this machine in a very short period of time, without the need of formal instruction.

While I have herein shown and described preferred embodiments of my invention, it is nevertheless to be understood that various changes may be made therein, without departing from the spirit and scope of the appended claims.

What I claim is:

1. A keyboard for stenographic machines comprising a block of keys for initial consonants arranged in three columns of keys selectively operated by the little finger, ring finger and middle finger of the left hand, a central block of keys for vowels and liquid consonants arranged in three columns, two of said columns comprising three keys and the third column having two keys, said central block keys being selectively operated by the index fingers and thumbs of both hands and by the middle finger of the right hand, and a block of keys for final consonants arranged in two columns of keys selectively operated by the ring finger and little finger of the right hand.

2. A keyboard for stenographic machines, as set out in claim 1, wherein the block of keys for initial consonants includes a liquid consonant.

3. A keyboard for stenographic machines, as set out in claim 1, with the addition of a set of types operatively connected to said keys in a predetermined sequence and bearing characters corresponding to the keys, two keys of the central block being for the liquid consonant "R," the types for these two keys being at the beginning and end respectively of the sequence of vowels and liquid consonants imprinted by said set of types.

4. A keyboard for stenographic machines, as set out in claim 2, wherein the central block of keys embodies a single pair of thumb-operated keys, each key being for a liquid consonant.

5. A single case keyboard for a stenographic machine comprising a maximum of eighteen keys including a block of six keys for initial consonants, a block of eight keys for vowels and liquid consonants, and a block of four keys for final consonants.

6. A stenographic machine including a single case keyboard consisting of a block of selectively operable keys bearing characters, for initial consonants, arranged in three columns of two keys each, a block of selectively operable keys bearing characters, for vowels and liquid consonants, arranged in three columns, two of said columns comprising three keys and the third column having two keys, a block of selectively operable keys bearing characters, arranged in two columns of two keys each, and a set of types operatively connected to said keys, the types bearing indicia which correspond to the indicia of the keys, the keys being operable singly or in multiple, to record a facsimile character of the key operated or a composite of two or more simultaneously operated keys.

7. A stenographic machine as set out in claim 6, wherein the characters of the types are strategically positioned and shaped to form the four initial consonants "S," "B," "D" and "N" when selected keys are depressed in a predetermined manner, either singly or in multiple the characters forming the four consonants designating, either singly or in multiple, at least fifteen consonantal values.

8. A stenographic machine, as set out in claim 7, wherein the characters of the types are strategically positioned and shaped to form the three final consonants "M," "D," and "S" when selected keys are depressed in a predetermined manner, either singly or in multiple, the characters forming the three consonants designating, either singly or in multiple, at least thirteen consonantal values.

9. A stenographic machine including a single case keyboard having a maximum of eighteen keys comprising a block of six keys for initial consonants, a block of eight keys for vowels and liquid consonants, and a block of four keys for final consonants, the machine further including a set of type bars operatively connected to said keys, and indicia bearing types mounted on said type bars, a plurality of said types including a main type portion and a supplemental type portion, the outer faces of said main and supplemental portions lying in different planes.

10. A stenographic machine, as set out in claim 9, wherein some of the supplemental type portions comprise indicia which have extensions of the main type portions and others embody types bearing indicia which are separate and distinct from the main type portions.

References Cited in the file of this patent

UNITED STATES PATENTS

| | | |
|---|---|---|
| 598,524 | Litchfield | Feb. 8, 1898 |
| 2,154,577 | Den Outer | Apr. 18, 1939 |
| 2,835,368 | Berkelmans | May 20, 1958 |